Aug. 12, 1947.  L. S. WASSERMAN  2,425,358
AIRPLANE TAB BALANCING MEANS
Filed Sept. 13, 1944
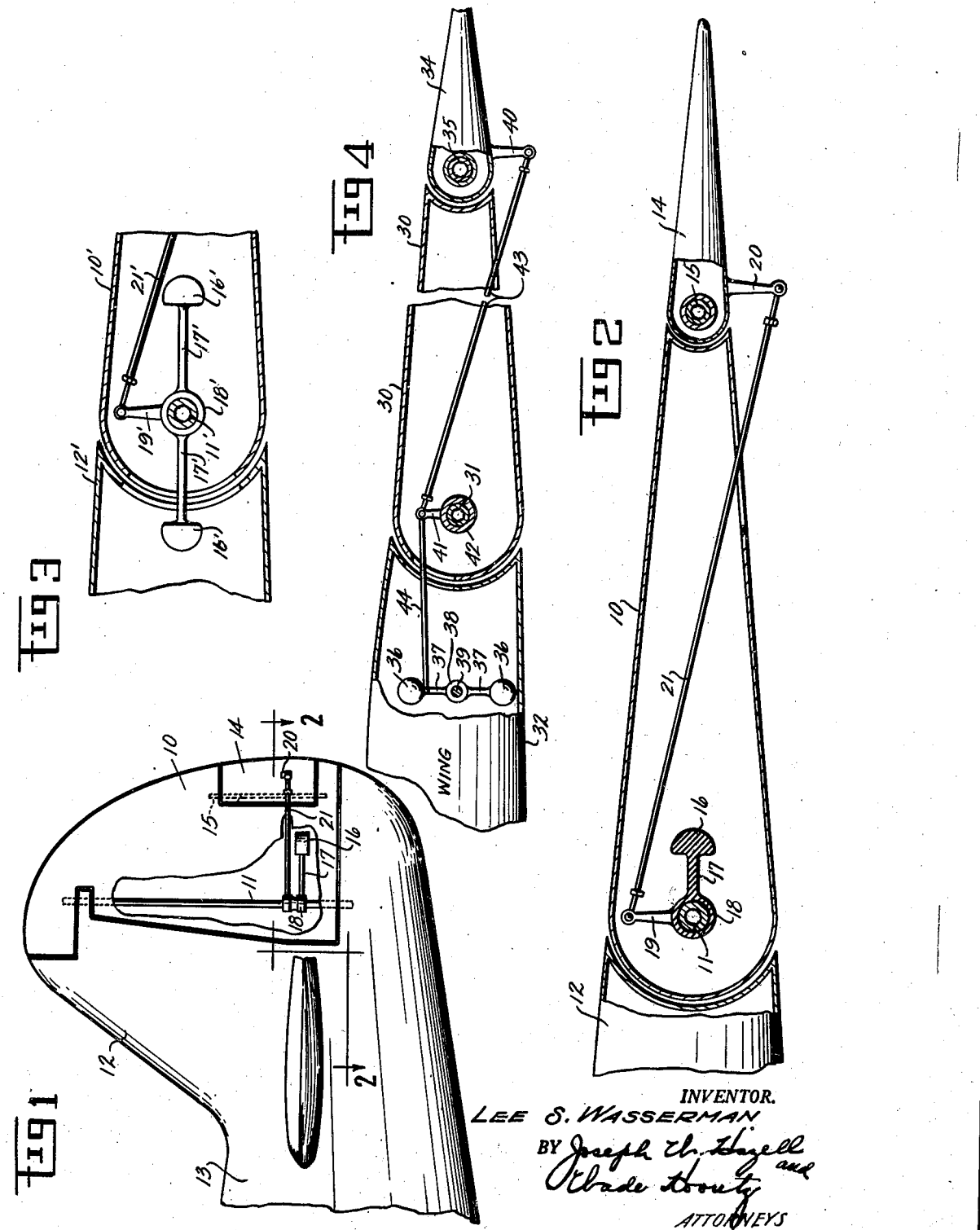
INVENTOR.
LEE S. WASSERMAN Patented Aug. 12, 1947

2,425,358

UNITED STATES PATENT OFFICE 2,425,358

AIRPLANE TAB BALANCING MEANS

Lee S. Wasserman, Dayton, Ohio

Application September 13, 1944, Serial No. 553,851

5 Claims. (Cl. 244—82)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to mass balancing means for tabs or trimming flaps provided on control surfaces of aircraft.

In some types of aircraft one or more of the hinged control surfaces thereof, such as the rudder, the elevator, the aileron, and the like, is provided with a trimming means in the form of a tab or flap hinged thereto, being utilized for counteracting an unbalanced thrust on the control surface, etc. A lateral or rotational vibration of the control surface of such aircraft tends to cause flutter and vibration in its attached tab.

Means has heretofore been provided for counterbalancing the mass or weight of the tab on the control surface. However, in such mass balancing means, a mass balancing weight is being used which is generally mounted at the leading edge of the tab, rearward of the trailing edge of the control surface, but a large counterbalance in the leading edge of such control surface is then also required, so that the mass balance of the entire control surface will remain equalized. Moreover, no means has so far been provided at all to prevent the flutter and vibration frequently caused in such tabs during flight.

It is one of the main objects of this invention to provide a mass balancing means for a tab which is hinged to a hinged control surface on aircraft, such as a rudder, elevator, aileron, and the like, which balancing means is arranged so that it can be mounted in any suitable plane on the aircraft, either vertical, horizontal, or at any angle thereto; and wherewith any vibration of the control surface will not be carried into the tab as flutter and vibration, but such control surface vibration will instead induce this balancing means to apply a balancing inertia moment to the tab.

Another object of this invention is to provide balancing weight means for a tab which is hinged on a hinged control surface on aircraft, said weight means being arranged and mounted so that any rotational or lateral vibrations of the control surface with the tab thereon will apply a torque to the weight means which in turn applies an opposite torque to the tab thus causing the weight means to apply a balancing and steadying effect to the tab.

A more particular object of this invention is to provide for such a tab, which is hinged on a hinged control surface on an airplane, a weighted balancing means wherein the weights are disposed in balanced relation and are mounted to rotate within the confines of the airplane, preferably around the hinge line of the control surface, and the weight means is connected with the tab, so that the direction of rotation of the weight means is opposite to the direction of rotation of the tab, in such a manner as to cause a balancing effect to the tab and to overcome fluttering and vibration of the tab and of its control surface.

These and various other objects and advantages are attained with this invention, as will become apparent from the following description, taken in connection with the accompanying drawing wherein the invention is shown in a few of its various suitable arrangements and forms, it being evident that other arrangements and forms of construction may be resorted to in carrying out the objects and purposes of this invention.

In the drawings:

Fig. 1 is a side elevational view of the empennage and rear portion of an aircraft, with parts broken away, showing my invention in a desirable form and as applied to the rudder and its trimming tab.

Fig. 2 is an enlarged horizontal sectional view thereof, taken substantially along line 2—2 of Fig. 1.

Fig. 3 is a partial sectional view of a slightly modified form of tab balancing weight means.

Fig. 4 is partly an elevation and partly a vertical sectional view of another modified form of this invention, showing the invention in connection with a wing and its pivoted aileron with tab hinged thereon.

As noted above, this invention is adapted for use in connection with various control surfaces of aircraft, such as the rudder, aileron, elevator, etc.; and for the purpose of illustration Figs. 1, 2 and 3 disclose how it may be applied to the rudder and its hinged tab, while Fig. 4 illustrates how the invention may be applied to the aileron.

Figs. 2 and 3 show the weight means arranged in two forms and manners, both being rotary on the hinge line of the control surface; and in Fig. 4 the invention is shown as including a pair of weights mounted in balanced relation in the fuselage of the airplane, forward of the hinged control surface and its hinged tab.

It should be noted and will be evident from the disclosure that the weight means can be pivotally mounted at any point in the airplane and in any geometric plane therein, either vertically, horizontally or at any angle thereto, as long as the weight means is associated with the control surface and its tab, and the rotational motion of the weight means is controlled by the motion of the tab, so that vibrations of the control surface will cause the weight means to apply a balancing inertia moment to the tab.

In Figs. 1 and 2 one form of the invention is shown as applied to a rudder 10 which is hinged or pivotally mounted at its leading edge, as by the torque tube or pivot member 11, onto the trailing edge portion of the vertical fin 12 of an airplane fuselage 13. The rudder has a trimming flap or tab 14 hinged to its trailing edge portion, as by hinge means or pivot member 15.

The form of my invention as shown in Fig. 2 comprises weight means in the shape of a weight 16 which is carried on the outer end of a supporting element or arm 17 extending from a mounting member in the shape of a collar 18 which is rotatably mounted on the pivot means 11 of the control surface 10, so that the weight is swingable about the pivot or hinge line of the control surface. An arm 19 extends from the mounting collar 18 and an arm 20 extends from tab 14, in a direction substantially opposite to that of arm 19, and link means 21 in the shape of a rod has its ends pivotally connected with the outer ends of said arms 19 and 20, so that rotary or swinging movement of the weight will be in a direction opposite to that of the tab. Thus, any rotational acceleration of the rudder and tab combination, and any vibration of the rudder, will apply a torque to the weight, which in turn applies an opposite torque to the tab; so that the weight is caused to apply a balancing inertia moment to the tab.

In Fig. 3 the invention is shown in a slightly modified form, wherein the weight means comprises a pair of weights 16' carried by a pair of arms 17' which extend in opposite directions from a collar 18' which is rotatably mounted on the pivot means 11' of the rudder 10' hinged on the fin 12' of the airplane. An arm 19' extends laterally from collar 18' and has link means 21' extending from its outer end to the arm on the tab, in a like manner as in the above described form, so as to rotate the weight means in a direction opposite to the rotation of the tab and cause the weight to apply a steadying effect to the tab. This weight means has its two weights 16' arranged in balanced relation and disposed symmetrically and rotationally about the hinge line of the control surface, thus providing a smoothly functioning device.

In Fig. 4 the invention is shown as applied to the aileron 30 which is hinged or pivoted at its leading edge by means 31 onto the trailing edge of wing 32 of the airplane, and has the trimming flap or tab 34 pivoted by means 35 to its trailing edge.

In this form of construction the weight means comprises a pair of weights 36 carried on a pair of arms 37 which extend in opposite directions from a ring or mounting member 38 rotary on a pin 39 on the fuselage. An arm 40 extends from tab 34 and an arm 41 extends from a collar 42 mounted to rotate on the pivot means 31 of the aileron 30, said arms 40 and 41 extending in directions opposite to each other; while the two arms are operatively connected with the weights by link means, including a link 43 connecting arms 40 and 41, and a link 44 connecting arm 41 with one of the weight arms 37. With this construction the tab arm 40 will rotate in a direction opposite to the arm 41 wherewith the weights are connected, so that a counter torque and retarding effect will be applied to the weight means and the arm 41 whenever motion is imparted thereto through movement of the tab arm and tab, whereby vibrations of the wing and its tab will cause the weight means to apply a balancing inertia moment to the tab and overcome vibrations and fluttering thereof.

I claim:

1. In an aircraft control system including a control surface and means pivotally mounting it on the aircraft and a tab hinged to the control surface, balancing means for the tab comprising an arm carried by the tab, a second arm mounted on said pivotal mounting means to swing about the hinge line of the control surface, means operatively connecting said arms, and weight means associated with the said second arm to be actuated thereby, so that rotary motion of the weight means is in a direction opposite to that of the tab arm, said second arm and said weight means being housed within the confines of the aircraft and protected from exterior air currents, whereby vibration of the control surface will cause the weight to apply a balancing inertia moment to the tab.

2. In an aircraft control system including a control surface and means pivotally mounting it on the aircraft and a tab hinged to the control surface, balancing means for the tab comprising an element mounted on and extending from the tab, a second element and means mounting it on said pivotal mounting means to rotate about the hinge line of the control surface and to extend therefrom in a direction opposite to the tab element within the interior of said control surface, link means operatively connecting said two elements, and weights disposed in balanced relation within the confines of the aircraft and associated with said second element to be swingably actuated thereby, so that rotation of said second element and of said weights is in a direction opposite to that of the tab element for balancing the tab against flutter and vibrations.

3. In an aircraft control system including a control surface hinged by a pivot member in its leading portion to the aircraft and a tab hinged to the control surface, balancing means for the tab comprising a weight and means mounting it to rotate about the pivot member of the control surface, an arm extending from said mounting means, means extending from said tab in a direction opposite to the arm, said weight and extending means being housed within the confines of the aircraft, and means operatively connecting said arm and said extending means, whereby rotation of the weight is opposite to the rotation of the tab, for balancing the tab against vibration of the control surface.

4. In an aircraft control system including a control surface hinged by a pivot member in its leading portion to the aircraft and a tab hinged to the trailing portion of the control surface, balancing means for the tab comprising a weight and a collar mounting it within the confines of the control surface to rotate about said pivot member within said surface, arms extending from said tab and from said collar and in opposite directions from each other, and link means operatively connecting said two arms, so that rotation of the weight and collars are counter to the rotation of the tab, whereby vibration of the control surface will cause the weight to apply a balancing inertia moment to the tab.

5. In an aircraft control system including a control surface and means pivotally mounting it on the aircraft and also a tab hinged to the trailing portion of the control surface, balancing means for the tab comprising a plurality of weights and means whereby they are mounted in balanced relation and to rotate about the rotational axis of the pivot means within the confines of the aircraft, means extending sideways from said tab, and link means connected with the last said means and also with said weight-mounting means and being arranged so that the direction of rotation of the tab is opposite to the direction of rotation of the weight, whereby vibration of the control surface will cause the weight to apply a balancing inertia moment to the tab.

LEE S. WASSERMAN.

REFERENCES CITED

The following references are of record in the file of this patent:

UNITED STATES PATENTS

| Number | Name | Date |
|---|---|---|
| 2,113,000 | Rowe | Apr. 5, 1938 |
| 2,238,403 | Soderquist et al. | Apr. 15, 1941 |
| 2,084,122 | Ayer | June 15, 1937 |

FOREIGN PATENTS

| Number | Country | Date |
|---|---|---|
| 467,057 | France | Mar. 21, 1914 |